United States Patent [19]

Chien

[11] 4,386,239
[45] May 31, 1983

[54] MULTIFREQUENCY TONE DETECTOR

[75] Inventor: Ta-Mu Chien, Freehold, N.J.

[73] Assignee: Bell Telephone Laboratories, Incorporated, Murray Hill, N.J.

[21] Appl. No.: 160,554

[22] Filed: Jun. 17, 1980

[51] Int. Cl.³ .................................................. H04M 1/50
[52] U.S. Cl. .................................. 179/84 VF; 328/138
[58] Field of Search ................... 179/84 VF; 328/138; 340/171 R; 324/78 R, 78 D

[56] References Cited

U.S. PATENT DOCUMENTS

| | | | |
|---|---|---|---|
| 2,974,281 | 3/1961 | Feldman | 324/77 H |
| 3,537,001 | 10/1970 | Friend | 179/84 VF |
| 3,539,731 | 11/1970 | Legedza | 179/84 VF |
| 3,582,565 | 6/1971 | Beeman et al. | 179/84 VF |
| 3,795,775 | 3/1974 | Cowpland | 179/84 VF |
| 3,875,347 | 4/1975 | Alaily | 179/84 VF |
| 4,091,243 | 5/1978 | Mizrahi et al. | 179/84 VF |

OTHER PUBLICATIONS

G. T. Kraemer et al., "The Family of Touch-Tone", Bell Laboratories Record, vol. 43, No. 7, Jul./Aug. 1965, pp. 283–287.

Primary Examiner—Joseph A. Popek
Attorney, Agent, or Firm—S. Sherman

[57] ABSTRACT

A signal recognition circuit (10) is disclosed which is capable of distinguishing between the digit tones used for dialing in multifrequency tone telephone sets, and spurious signals at the same frequencies, such as noise and voice. The discriminator comprises, in cascade, an AGC amplifier (11), an adjustable threshold comparator (12), and a signal validation circuit (13). The operation of the discriminator is based upon the fact that the true dialing tones have envelopes of constant magntiude whereas the spurious signals tend to have pronounced envelope variations. By the appropriate adjustment of the comparator threshold, these variations show up as gaps in the comparator output signal, which are readily detected by the validation circuit.

5 Claims, 6 Drawing Figures

MULTIFREQUENCY TONE DETECTOR

TECHNICAL FIELD

This application relates to multifrequency tone receivers and, in particular, to a signal discriminator circuit for use in such receivers.

BACKGROUND OF THE INVENTION

The use of frequency encoded, decimal digit dialing in the telephone system requires a receiving circuit that is capable of detecting the tone signals originating at the subscriber's telephone. Such a receiver typically includes a tone detector capable of meeting two essential requirements. On one hand, it must be sufficiently sensitive to recognize the tone signals. On the other hand, it must be capable of discriminating between spurious signals, such as noise and speech, and valid dialing tones. These detector characteristics represent, to a large extent, conflicting requirements and, hence, any practical solution must involve a compromise between the ideal fulfillment of each. One approach, as described in an article by G. T. Kraemer and L. C. J. Roscoe, entitled "The Family of Touch-Tone Receivers," published in the 1965 July/August issue of the *Bell Laboratories Record*, Vol. 43, No. 7, pp. 282-287, employs the so-called "limiter guard action," whose operation is based upon the fact that an amplitude-limited signal contains a fixed amount of energy. Thus, an amplitude-limited spurious signal, containing many frequency components, will not contain sufficient energy at any one frequency to exceed a predetermined "critical threshold." A valid dial tone, on the other hand, has all its energy concentrated at the frequency of interest and, hence, readily exceeds the critical threshold. To increase the discriminator sensitivity, feedback to the limiter input is also employed. The net effect, however, is to limit the dynamic range of the receiver.

In an alternate approach, a separate voice filter and detector are provided which serve to disable the receiver whenever the voice channel signal exceeds a predetermined level. If made too sensitive, however, receiver noise can cause the voice channel to disable the receiver in the presence of a valid digit tone signal.

SUMMARY OF THE INVENTION

The above-described limitations are avoided in a discriminator whose operation relies upon the fact that spurious digit-simulating signals typically have envelope variations that are not present in a valid digit tone signal. Accordingly, a multifrequency tone discriminator circuit, in accordance with the present invention, includes, in cascade, an AGC amplifier whose output signal envelope exceeds a predetermined level for a given dynamic range of input signals; a comparator circuit for comparing the amplifier output signal with a reference signal and for producing an output signal only when the envelope of the input signal to said comparator exceeds said predetermined level; and means for examining the comparator output signal for selected characteristics. Because of the envelope variations present in a spurious signal, the output from the tone discriminator circuit produced by a spurious signal is readily distinguishable from that of a valid digit tone signal.

DETAILED DESCRIPTION

Figure 1:
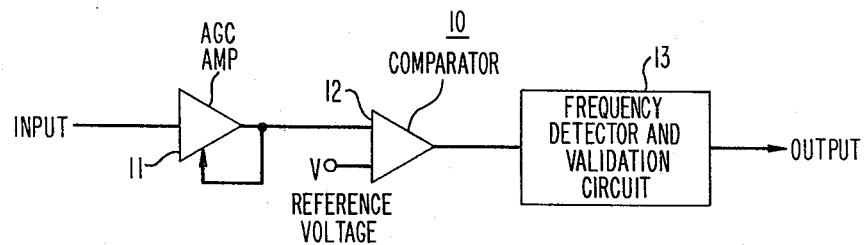
FIG. 1 shows, in block diagram, the basic elements of a digit tone discriminator in accordance with the invention.

Referring to the drawings, FIG. 1 shows the basic elements of a digit tone discriminator in accordance with the present invention. Typically, the discriminator 10 comprises, in cascade, an AGC amplifier 11, a comparator 12, and a frequency detector and validation circuit 13.

Figure 2:
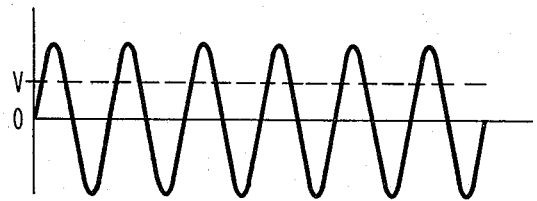
FIGS. 2, 3, 4 and 5 show various waveforms produced by true digit tones and by typical spurious signals.

The operation of the discriminator is based upon the recognition that the envelope of a true digit tone has a relatively constant amplitude. By contrast, voice and other spurious signals have pronounced envelope variations. Discriminator 10 is, accordingly, specifically designed to detect these variations. Consider, for example, a true digit tone. When received, it has an amplitude which falls within a specified range of amplitudes. AGC amplifier 11 is designed to produce an output signal which exceeds a predetermined level V for input signals within this dynamic range. FIG. 2 shows an amplifier output signal whose envelope, as can be seen, exceeds the predetermined level V over its entire duration.

Figure 3:
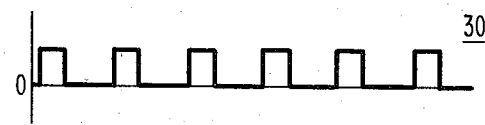
Figure 4:
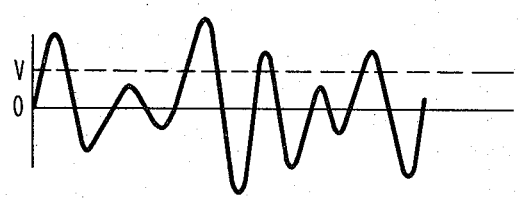
Figure 5:
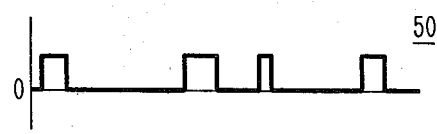

This signal is, in turn, coupled to comparator 12 along with a reference signal V, wherein they are compared, and an output signal produced whenever the input signal exceeds the reference signal. The resulting output signal from comparator 12 is shown in FIG. 3. It will be noted that inasmuch as the input signal to the comparator exceeds the reference level V once each cycle, the resulting output signal is a train of equally spaced, uniform pulses 30. The frequency and other characteristics of pulse train 30 are examined in the frequency detector and validation circuit 13, whose output indicates reception of a true digit tone. If, however, a spurious signal is applied to the discriminator circuit, a different result obtains. Consider, for example, the signal illustrated in FIG. 4. As can be seen, because of the envelope variations, the output signal from amplifier 11 does not exceed the threshold V each cycle. Consequently, the resulting output signal from the comparator, as illustrated in FIG. 5, is a pulse train 50 characterized by unequal spaces between pulses, and by pulses of unequal duration. These distinguishing features of such a pulse train are readily recognized by the detector and validation circuit as a spurious signal. Consequently, no output is produced by the validation circuit 13. An example of a frequency detector and validation circuit that can be employed to practice the invention is described in U.S. Pat. No. 3,537,001.

Figure 6:
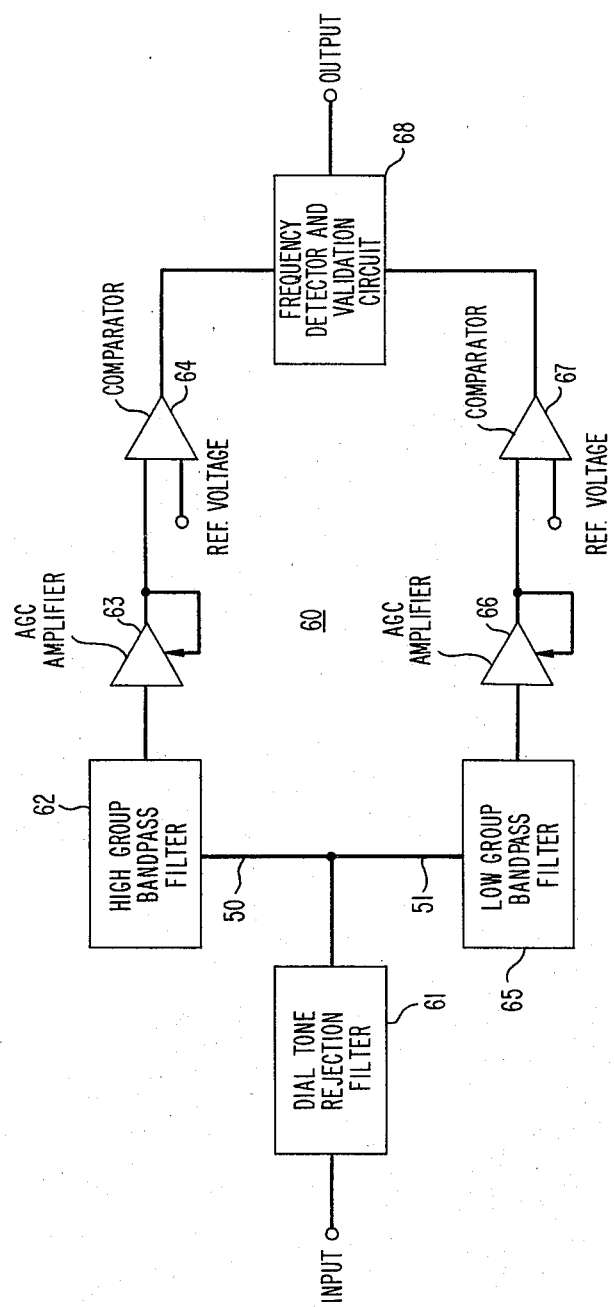
FIG. 6 shows one embodiment of a multifrequency receiver incorporating the present invention.

FIG. 6 shows, in block diagram, a multifrequency receiver 60 incorporating the present invention. The receiver typically includes a dial tone rejection filter 61 for rejecting the dial tone and band-limiting any incoming noise. The receiver circuit then divides into two branches 50, 51 for separately processing the high group digit tones and low group digit tones, respectively. In the illustrative embodiment, branch 50 includes, in cascade, a high group bandpass filter 62, an AGC amplifier 63, and a comparator 64. Similarly, branch 51 includes, in cascade, a low group bandpass filter 65, an AGC amplifier 66, and a comparator 67. The outputs from the two comparators are coupled to a frequency detector and validation circuit 68.

The operation of each branch of receiver 60 is as explained hereinabove.

It will be recognized that the receiver configuration shown in FIG. 6 is merely illustrative of such receivers. Depending upon the particular system, it may be adequate to employ the invention in only one of the receiver branches. Some systems may benefit by the inclusion of an additional AGC amplifier following the dial tone filter. Thus, it is clear that the discriminator circuit disclosed herein can just as readily be used in a variety of receiver configurations wherever signal discrimination between constant signal tones and variable amplitude tone is called for.

I claim:

1. A multifrequency tone receiver comprising:
   first and second signal paths;
   said first path including, in cascade, a first bandpass filter, an AGC amplifier, and a first signal comparator;
   said second path including, in cascade, a second bandpass filter, and a second signal comparator;
   means connecting the input ports of said first and second filters to a common signal path;
   and means connecting the output ports of said first and second signal comparators to a frequency detector and validation circuit.

2. The receiver according to claim 1 wherein said second path includes a second AGC amplifier connected between said second filter and said second comparator.

3. The receiver according to claim 2 wherein each AGC amplifier produces an output signal whose envelope exceeds a given level over a specified dynamic range of input signals.

4. The receiver according to claim 1 wherein each comparator compares the signal applied thereto with a reference signal, and produces an output signal when the envelope of said applied signal exceeds said reference signal.

5. The receiver according to claim 1 wherein said AGC amplifier produces an output signal whose envelope exceeds a given level over a specified dynamic range of input signals.

* * * * *